United States Patent [19]

Danner

[11] 4,417,787
[45] Nov. 29, 1983

[54] FIVE-COMPONENT MICROSCOPE OBJECTIVE

[75] Inventor: Lambert J. Danner, Vienna, Austria

[73] Assignee: C. Reichert Optische Werke AG, Vienna, Austria

[21] Appl. No.: 322,057

[22] Filed: Nov. 16, 1981

[51] Int. Cl.³ .................. G02B 9/60; G02B 21/02
[52] U.S. Cl. .................................. 350/414; 350/465
[58] Field of Search ........................... 350/414, 465

[56] References Cited

U.S. PATENT DOCUMENTS

| | | | |
|---|---|---|---|
| 3,879,111 | 4/1975 | Goto | 350/414 |
| 4,037,934 | 7/1977 | Matsubara | |
| 4,184,747 | 1/1980 | Vetake | |
| 4,208,099 | 6/1980 | Tojyo | 350/465 |

Primary Examiner—John K. Corbin
Assistant Examiner—Rebecca D. Gass
Attorney, Agent, or Firm—Alan H. Spencer

[57] ABSTRACT

An infinity-corrected, semi-apochromatic microscope objective having an N.A. of 0.85 has five elements and provides a magnification of 50× when used with a telescope objective having an effective focal length (efl) of 183 mm.

1 Claim, 1 Drawing Figure

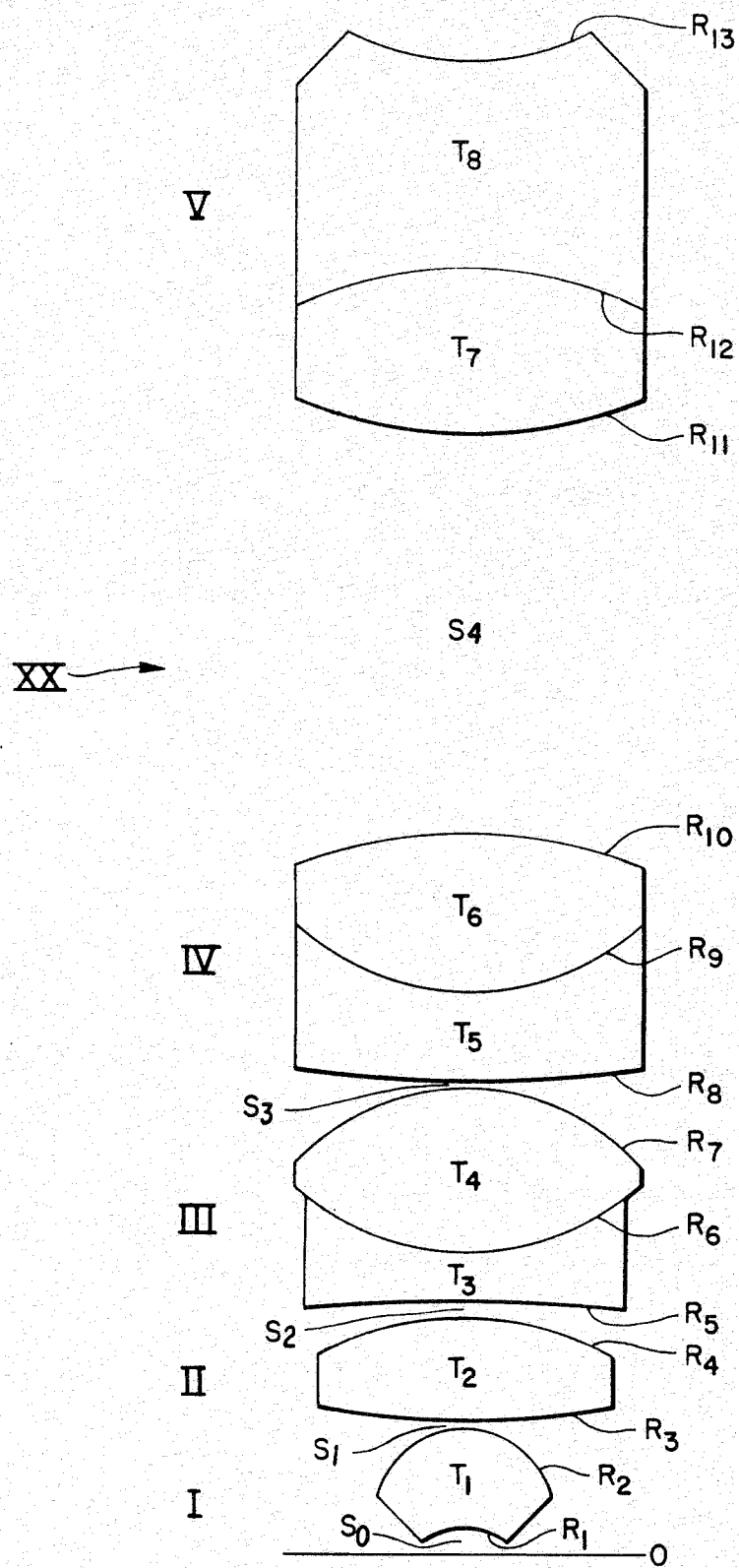

FIVE-COMPONENT MICROSCOPE OBJECTIVE

BACKGROUND OF THE INVENTION

This invention relates to microscope objectives and more particularly to infinity corrected microscope objectives having and N.A. of substantially 0.85.

It is an object of this invention to provide objectives well corrected for all aberrations except lateral chromatic aberration. The residual lateral chromatic aberration between 486.1 nm and 656.3 nm is 1% of the angular magnification at 589.3 nm across usable field.

When used with a telescope lens having an effective focal length (efl) of 183 nm, the objective provides a lateral magnification of substantially 50× at 589.3 mm.

U.S. Pat. No. 4,037,934 issued July 26, 1977 relates to a five-component microscope objective having a magnification of 50× to 70× and an N.A. of 0.95 with longitudinal chromatic aberration corrected to a degree providing a semi-apochromatic objective. The lens components of this objective differ from those of the present invention in that the fourth component is a singlet spaced closely to the fifth component while in the objective of the present invention, the fourth component is a doublet widely spaced from the fifth component. In addition, the first condition considered essential by the reference patentee is not satisfied since the dispersion value of the first lens is less than 45.

U.S. Pat. No. 4,184,747 issued Jan. 22, 1980 is the closest reference to the structure of the present invention and described a five-component microscope objective having a power of 40×. The structure of this patented objective differs from that of the present invention in that the third lens component of the reference has a radius greater than 0 while the structure of the third lens component of the present invention provides a first surface which is plano, i.e. radius equals ∞. Furthermore, the second lens component of the present invention is a bi-convex singlet instead of a concavo-convex singlet required by the reference. In addition, the structure of the present invention does not satisfy the seven requirements of the reference defined as necessary to obtain a flat image field and good aberration correction.

THE DRAWING

FIG. 1 is an optical diagram of the objective according to the present invention.

SUMMARY OF THE INVENTION

The first lens I is a concavo-convex singlet followed by a bi-convex singlet II followed in succession by a plano convex doublet III and a bi-convex doublet IV. The final component is a convex-concavo doublet V.

DESCRIPTION OF THE PREFERRED EMBODIMENT

With respect to lens parameters, the axial thickness of successive lens elements are designated $T_1$ to $T_8$ and the axial spaces from the object plane designated O are $S_0$ to $S_4$. The successive lens radii are designated $R_1$–$R_{13}$ where a minus sign (−) applies to surfaces whose center of curvature lies on the object side of the vertices. The refractive indexes and Abbe numbers of the glass in the successive lenses are designated $ND_1$ to $ND_8$ and $\nu_1$ to $\nu_8$.

TABLE I

| Lens No. | Radius (R) | Thickness (T) | Spacing (S) | Index of Refraction (ND) | Abbe No. ($\nu$) |
|---|---|---|---|---|---|
| | | | $S_0 = 0.794$ | | |
| I | $R_1 = -2.0075$ | $T_1 = 3.15$ | | $ND_1 = 1.78161$ | $\nu_1 = 37.08$ |
| | $R_2 = -2.8929$ | | | | |
| | | | $S_1 = 0.30$ | | |
| II | $R_3 = 25.935$ | $T_2 = 3.20$ | | $ND_2 = 1.564$ | $\nu_2 = 60.80$ |
| | $R_4 = -10.411$ | | | | |
| | | | $S_2 = 0.30$ | | |
| | $R_5 = \infty$ | $T_3 = 1.80$ | | $ND_3 = 1.673$ | $\nu_3 = 32.20$ |
| III | $R_6 = 8.498$ | $T_4 = 5.00$ | | $ND_4 = 1.434$ | $\nu_4 = 95.58$ |
| | $R_7 = -8.184$ | | | | |
| | | | $S_3 = 0.50$ | | |
| | $R_8 = 109.720$ | $T_5 = 2.80$ | | $ND_5 = 1.717$ | $\nu_5 = 29.50$ |
| IV | $R_9 = 8.498$ | $T_6 = 5.00$ | | $ND_6 = 1.434$ | $\nu_6 = 95.58$ |
| | $R_{10} = -15.435$ | | | | |
| | | | $S_4 = 12.70$ | | |
| | $R_{11} = 15.435$ | $T_7 = 5.10$ | | $ND_7 = 1.762$ | $\nu_7 = 26.94$ |
| V | $R_{12} = -15.435$ | $T_8 = 6.50$ | | $ND_8 = 1.673$ | $\nu_8 = 32.20$ |
| | $R_{13} = 7.735$ | | | | |

I claim:

1. A semi apochromatic microscope objective having an N.A. of substantially 0.85 which comprises a concavo-convex singlet I, a bi-convex singlet II, a plano convex doublet III, a bi-convex doublet IV, and a convex-concavo doublet V aligned sequentially on an optical axis and having the following parameters:

| Lens No. | Radius (R) | Thickness (T) | Spacing (S) | Index of Refraction (ND) | Abbe No. ($\nu$) |
|---|---|---|---|---|---|
| | | | $S_0 = 0.794$ | | |
| I | $R_1 = -2.0075$ | $T_1 = 3.15$ | | $ND_1 = 1.78161$ | $\nu_1 = 37.08$ |
| | $R_2 = -2.8929$ | | | | |
| | | | $S_1 = 0.30$ | | |
| | $R_3 = 25.935$ | | | | |

-continued

| Lens No. | Radius (R) | Thickness (T) | Spacing (S) | Index of Refraction (ND) | Abbe No. ($\nu$) |
|---|---|---|---|---|---|
| II |  | $T_2 = 3.20$ |  | $ND_2 = 1.564$ | $\nu_2 = 60.80$ |
|  | $R_4 = -10.411$ |  |  |  |  |
|  |  |  | $S_2 = 0.30$ |  |  |
|  | $R_5 = \infty$ |  |  |  |  |
|  |  | $T_3 = 1.80$ |  | $ND_3 = 1.673$ | $\nu_3 = 32.20$ |
| III | $R_6 = 8.498$ |  |  |  |  |
|  |  | $T_4 = 5.00$ |  | $ND_4 = 1.434$ | $\nu_4 = 95.58$ |
|  | $R_7 = -8.184$ |  |  |  |  |

-continued

| Lens No. | Radius (R) | Thickness (T) | Spacing (S) | Index of Refraction (ND) | Abbe No. ($\nu$) |
|---|---|---|---|---|---|
|  | $R_8 = 109.720$ |  |  |  |  |
|  |  |  | $S_3 = 0.50$ |  |  |
|  |  | $T_5 = 2.80$ |  | $ND_5 = 1.717$ | $\nu_5 = 29.50$ |
| IV | $R_9 = 8.498$ |  |  |  |  |
|  |  | $T_6 = 5.00$ |  | $ND_6 = 1.434$ | $\nu_6 = 95.58$ |
|  | $R_{10} = -15.435$ |  |  |  |  |
|  |  |  | $S_4 = 12.70$ |  |  |
|  | $R_{11} = 15.435$ |  |  |  |  |
|  |  | $T_7 = 5.10$ |  | $ND_7 = 1.762$ | $\nu_7 = 26.94$ |
| V | $R_{12} = -15.435$ |  |  |  |  |
|  |  | $T_8 = 6.50$ |  | $ND_8 = 1.673$ | $\nu_8 = 32.20$ |
|  | $R_{13} = 7.735$ |  |  |  |  |

* * * * *